System of Selection and Display of Graphical Data by Holography

[54] SYSTEM OF SELECTION AND DISPLAY OF GRAPHICAL DATA BY HOLOGRAPHY

[76] Inventors: Christian S. Bolusset, Kerlerranouet, Perros-Guirec; Michel E. Treheux, Servel, Lannion; Jean C. LeGall, rue des Bruyeres, La Clarte-Ploumanach, Perros-Guirec; Francois LeBer, allee des Bruyeres, Lannion, all of France

[22] Filed: Sept. 4, 1973

[21] Appl. No.: 394,302

Related U.S. Application Data

[63] Continuation of Ser. No. 207,151, Dec. 13, 1971, abandoned.

[30] Foreign Application Priority Data

Dec. 11, 1970  France .............................. 70.44831
Dec. 1, 1971  France .............................. 71.43116

[52] U.S. Cl. ............................ 350/3.5, 340/173 LT
[51] Int. Cl. ............................................. G02b 27/00
[58] Field of Search 350/3.5; 340/173 LT, 173 LM; 250/219 D, 219 DD

[56] References Cited
UNITED STATES PATENTS 3,560,071  2/1971  Silverman et al. ................... 350/3.5
3,610,722  10/1971  Bestenreiner et al. ............. 350/3.5
3,612,640  10/1971  Kogelnik ........................... 350/3.5

Primary Examiner—Ronald J. Stern
Attorney, Agent, or Firm—Abraham A. Saffitz

[57] ABSTRACT

System for recording graphical data in the form of holograms on a plurality of hologram carriers, each hologram carrier storing a group of holograms, and for reading selected ones of these graphical data. The recording means includes an object carrier for holding transparent objects, a coherent light source giving rise to an object beam passing through an object and a recording reference beam describing a cone around the axis of the object beam and able to take discrete azimuthal angular positions on the cone. The reading means includes a coherent light source giving rise to a reading reference beam describing a cone around the normal to the hologram carrier and able to take discrete azimuthal angular positions on the cone. The hologram carriers are arranged in a matricial array and a given hologram has three addresses: the coordinates of the hologram carrier which contains it and an angle which is the position of the reading reference beam on the cone which it describes.

4 Claims, 9 Drawing Figures

SYSTEM OF SELECTION AND DISPLAY OF GRAPHICAL DATA BY HOLOGRAPHY

This is a continuation, of application Ser. No. 207,151, filed 12/13/71, now abandoned.

BACKGROUND AND SUMMARY OF THE INVENTION

The present invention relates to a system for storing, accessing and displaying graphical data such as signatures, printed, typewritten or manuscript inscriptions, diagrams, drawings or graphs. It uses the properties of holography.

More particularly the invention relates to a system for selecting and visualizing a graphical data out of a very large number of such data stored by groups on a plurality of hologram carriers.

It is known that it is possible by means of the holography technique to record any object by making the beam diffracted by this object, i.e., the object beam, and a reference beam, both of which originate from the same coherent light source, interfere on a photographic plate or other photosensitive medium. Several object functions can be used in order to produce the object beam:

in simple holography, the Huyghens-Fresnel diffraction function;

in Fourier holography, the Fourier transform of the transparency function $F(x,y)$ of the object, obtained by means of a lens;

a transform function of the transparency function of the object obtained by any optical complex.

Let $U(\xi, \eta)$ be the function representing the wave originating from the object in the plane $\xi O \eta$ in one of the preceding cases, $\xi O \eta$ being the plane of the photosensitive plate.

Let $K(\xi, \eta)$ be the reference wave, assumed to be plane;

M be a point of the plane $\xi O \eta$; and $\vec{K}$ be the unit vector normal to the reference wave. The difference of phase $\Phi$ between the plane $\xi O \eta$ and the reference wave is characterized by the quantity. (FIG. 1):

$$\Phi = 2\pi d/\lambda = 2\pi/\lambda \; OM \sin \theta = 2\pi/\lambda \; \vec{OM}.\vec{k}$$

The function of the plane reference wave in respect of the plane $\xi O \eta$ is:

$$K(\xi, \eta) = |K| e^{j(2\pi/\lambda)} \vec{OM}.\vec{k} \quad (1) \text{ (k amplitude of the wave)}$$

Assume a point P of the object. Its diffration function in the vicinity of the point M can be written in the same way $$u(\xi, \eta) = |u| e^{j(2\pi/\lambda)} \vec{OM}.\vec{u} \quad (2)$$

where $\vec{u}$ is the unit vector of the direction PM.

The diffraction function in the plane $\xi O \eta$ is:

$U(\xi, \eta) = \Sigma u(\xi, \eta)$ for all the points P of the plane $xy$ $U(\xi, \eta)$ can be a Fourier transform, or some other diffraction function.

By means of photographic recording, the sum of the object beam and of the reference beam gives a transparency function of the exposed plate $$I(\xi, \eta) = \{[U(\xi, \eta) + K(\xi, \eta)][U^*(\xi, \eta) + K^*(\xi, \eta)]\}^{-\gamma/2}$$

where $\gamma$ is a constant dependent on the photographic plate used.

If we assume that $K(\xi, \eta) \gg U(\xi, \eta)$ we can write:

$$I(\xi, \eta) = (KK^*)^{-\gamma/2}[1 - \gamma/2 \; U(\xi, \eta)/K(\xi, \eta) - \gamma/2 \; U^*(\xi, \eta)/K^*(\xi, \eta)]$$

and, as $KK^* = |K|^2$ the result is:

$$I(\xi, \eta) = |K|^{-\gamma}[1 - \gamma/2 \; U(\xi, \eta)/K(\xi, \eta) - \gamma/2 \; U^*(\xi, \eta)/K^*(\xi, \eta)] \quad (3)$$

The photographic plate being exposed, and $I(\xi, \eta)$ being its transparency function, the result of projecting onto it the reference wave is $$I(\xi, \eta) K(\xi, \eta) = |K|^{-\gamma}[K(\xi, \eta) - \gamma/2 \; U(\xi, \eta) - \gamma/2 \; K(\xi, \eta) \; U^*(\xi, \eta)/K^*(\xi, \eta)] \quad (4)$$

the first term of the second section representing a part of the directly transmitted reference wave, while the third term represents a diffracted function in a direction determined by $2 \sin \theta$. In fact $$K(\xi, \eta)/K^*(\xi, \eta) = e^{2j\phi} = e^{j(2\pi/\lambda) \; OM(2 \sin \theta)}$$

Only the second term, in which we rediscover the diffraction function of the object, is of interest and makes possible integral reconstitution of the object.

If we now assume that $n$ transparency functions have been superimposed on the plate:

$$I_1(\xi, \eta) + I_2(\xi, \eta) + \ldots + I_p(\xi, \eta) + \ldots + I_n(\xi, \eta)$$

which correspond respectively to the reference waves $$K_1(\xi, \eta) \ldots K_p(\xi, \eta) \ldots K_n(\xi, \eta)$$

and that one directs onto the plate containing these $n$ transparency functions the wave $K_q(\xi, \eta)$, the result is:

$$\sum_{p=1}^{p=n} I_p(\xi, \eta) K_q(\xi, \eta)$$

When $p=q$ one finds oneself in the case where there is just one transparency function, and the function $U_p(\xi, \eta)$ is reconstituted. When $p \neq q$ we have as third terms of equation (4) the terms $$U_p(\xi, \eta) \times \frac{K_q(\xi, \eta)}{K_p(\xi, \eta)} \quad (5)$$

As $$U_p(\xi, \eta) = \sum_{(xy)} u_p(\xi, \eta)$$

we can write expression (5)

$$\sum_{(x, y)} u_p(\xi, \eta) e^{j(2\pi/\lambda)(\vec{k_q} - \vec{k_p}) \vec{OM}}$$

$$= \sum_{(x, y)} \sum_{(\xi, \eta)} |u| e^{j(2\pi/\lambda)(\vec{u_p} + \vec{k_{pq}}) \vec{OM}}$$

by making $\vec{k_{pq}} = \vec{k_q} - \vec{k_p}$

Illumination with the wave front characterized by $\vec{k_q}$ of the hologram recorded with the wave front $\vec{k_p}$ results not in the function $u_p$, characterized by the vector $\vec{u_p}$, but in a function $u'_p$, characterized by $\vec{u_p} + \vec{k_{pq}}$. In other words, the function registered in the vicinity of the point M will no longer be in the direction $\vec{u_p}$, as at the exposure, but in a direction $\vec{u_p} + \vec{k_{pq}}$.

At the moment the exposure is made it will be necessary to use various reference beams sufficiently separated in terms of angle to render $\vec{k_{pq}}$ large enough to prevent the image which corresponds to the exposure with the reference beam of direction $\vec{k_p}$ encroaching on the exposure with the reference beam of direction $\vec{k_q}$. In the particular case where the various $k$ are on a cone whose axis is perpendicular to $\xi O \eta$, $\vec{k_{pq}}$ is parallel to $\xi O \eta$ and determines the field angle. That is, the reference beam will have to be turned on the cone by an angle at least equal to that of the field of the object so as to prevent overlapping during the reconstruction.

It will thus be seen that two superimposed holograms correspond to two functions of transparency $F_1(x,y)$ and $F_2(x,y)$ can be separated during reading if the first is read with a reference beam of direction $\vec{k_p}$ and the second with a reference beam of direction $\vec{k_q}$, $\vec{k_p}$ and $\vec{k_q}$ being respectively the directions of the reference beams during recording of the holograms.

According to the invention, a plurality of hologram carriers in the form of small photographic plates is arranged in a matrix array on a plate and each hologram carrier is defined by two coordinates, Cartesian or polar. A plurality of holograms is formed on one and the same carrier, about sixty for example, and these holograms are read-out with a reference beam able to describe a cone relative to the normal to the carrier and to be immobilized on this cone along a plurality of discrete azimuth directions. Selection of a particular hologram on a given carrier depends on the azimuth direction of the reference beam on the cone which it describes.

Access to a given hologram is thus defined by three addresses: two Cartesian or polar coordinates defining the carrier bearing the hologram sought for and an angle which is the azimuth of the reference beam on its cone, defining the hologram sought for among those recorded on the carrier concerned.

Recording several holograms in a single hologram carrier involves both an object beam normal to the hologram carrier and a recording reference beam oblique and relatively rotatable with respect to said hologram carrier. Displaying a particular hologram cut of those recorded in a single hologram carrier involves a displaying reference beam oblique and relatively rotatable with respect to said hologram carrier. Of course relative rotation of the recording and displaying beams with respect to the hologram carrier can be achieved by cooperation of a rotating reference beam and a fixed hologram carrier or of a fixed reference beam and a rotating hologram carrier. If the orientation of the object is fixed and if a fixed image orientation is wanted, the relative rotation of the reference beam and hologram carrier must be provided in the same way during recordal and display. The hologram carrier must be fixed with respect to rotating recording and displaying reference beams or the hologram carrier must be rotating with respect to fixed reocrding and displaying reference beams. If the recording reference beam is fixed during exposure and, each time the object is changed, only the hologram carrier is made to turn, and if the displaying reference beam is made to turn, and if the displaying reference beam is made to turn with respect to a fixed hologram carrier, it will be seen during reconstruction that the images of two successive objects form, in the image plane, an angle equal to that at which the hologram carrier was made to turn in order to pass from the first object to the second. Supposing for example that the successive objects inscribed on one hologram carrier are sixty successive pages of a book and that from a page to the following the hologram carrier rotation is 6°, it will be seen that if the first image is read on a screen with its lines horizontal, the succeeding image will have its lines inclined by 6° to the horizontal.

The hologram carriers of the invention device, when used for display, are inserted in a plate and cannot rotate about their own axis. It results that two processes of recordal can be used: (i) rotating recording reference beam and fixed hologram carrier, (ii) fixed recording reference beam and hologram carrier rotating together with the object carrier. In the last case, and in view of the large number of objects which must be placed successively on the object-carrier, for example the successive images of a film, it is advantageous to leave the object-carrier fixed and to make a virtual object deduced from the real object by an optical system do the turning.

BRIEF DESCRIPTION OF THE DRAWINGS

The system of recording, accessing and displaying data in the form of holograms will now be described in detail in connection with the attached drawings in which.

DESCRIPTION OF THE PREFERRED EMBODIMENTS

Figure 1:
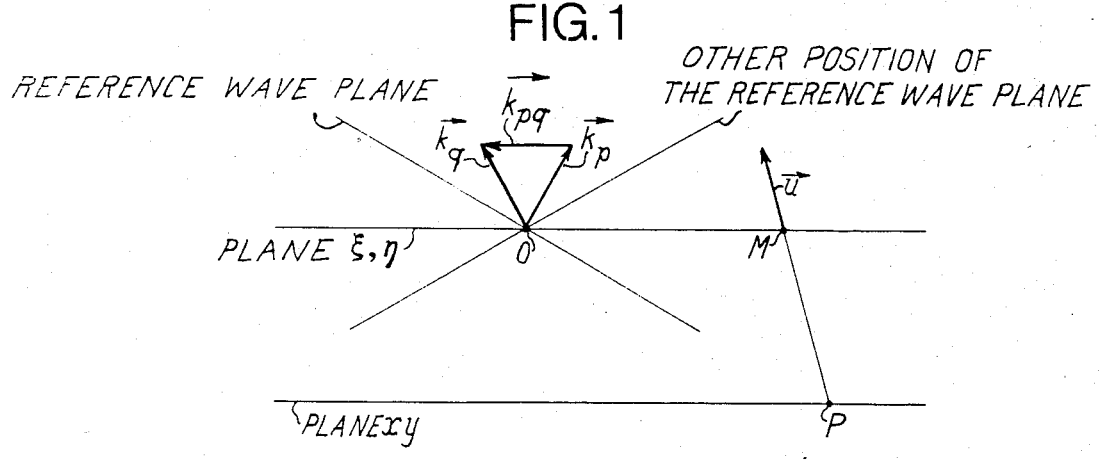
FIG. 1 is a geometric diagram intended to explain the mathematical part of the introductory material.
Figure 2:
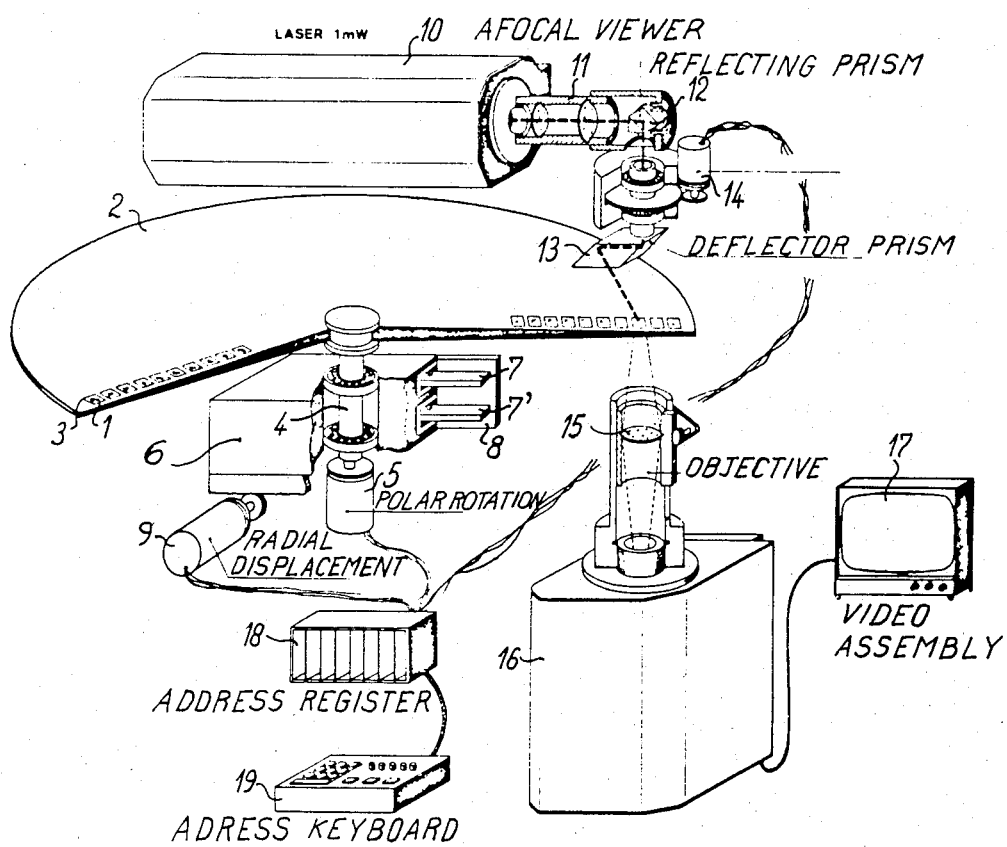
FIG. 2 shows a first device according to the invention for reading the holograms.

Referring first to FIG. 2, photographic plates 1 each containing a plurality of holograms are disposed in the sockets 3 of a circular plate 2. This plate can turn around a shaft 4 under the control of a motor 5. The motor 5 is mounted on a mobile chassis 6 which is able to slide on rails 7, 7' fixed to a stationary structure 8. A motor 9 fixed to the structure makes it possible to slide the chassis 6 on the rails 7, 7'. The motors 5 and 9 are either stepping motors or servo-motors. They receive from an address register 18 positioned by an address keyboard 19, respectively an angular address which controls the motor 5, and a distance address which controls the motor 9. The address register 18 thus makes it possible to position an hologram carrier 1 corresponding to given addresses under a laser beam as it will be seen hereunder.

The reference number 10 refers to a helium neon laser transmitter with a one milliwatt output which supplies the displaying reference beam. This beam traverses an afocal viewer 11 horizontally then falls on a prism 12 which reflects it vertically. The beam then falls on a rotating deflector prism 13 which makes it describe a cone. The prism 13 is rotated by a motor 14 which receives an angular hologram address α from the address register 18.

The beam traverses the holographic plate 1, then the objective 15. An image tube, a vidicon for example, situated inside the case 16, is situated in front of this objective. The photocathode is in the plane conjugate with that of the initial object, relative to the objective 15.

The vidicon includes scanning circuits and is linked to a video television receiver on the screen of which the graphical data are reconstructed.

Figure 3:
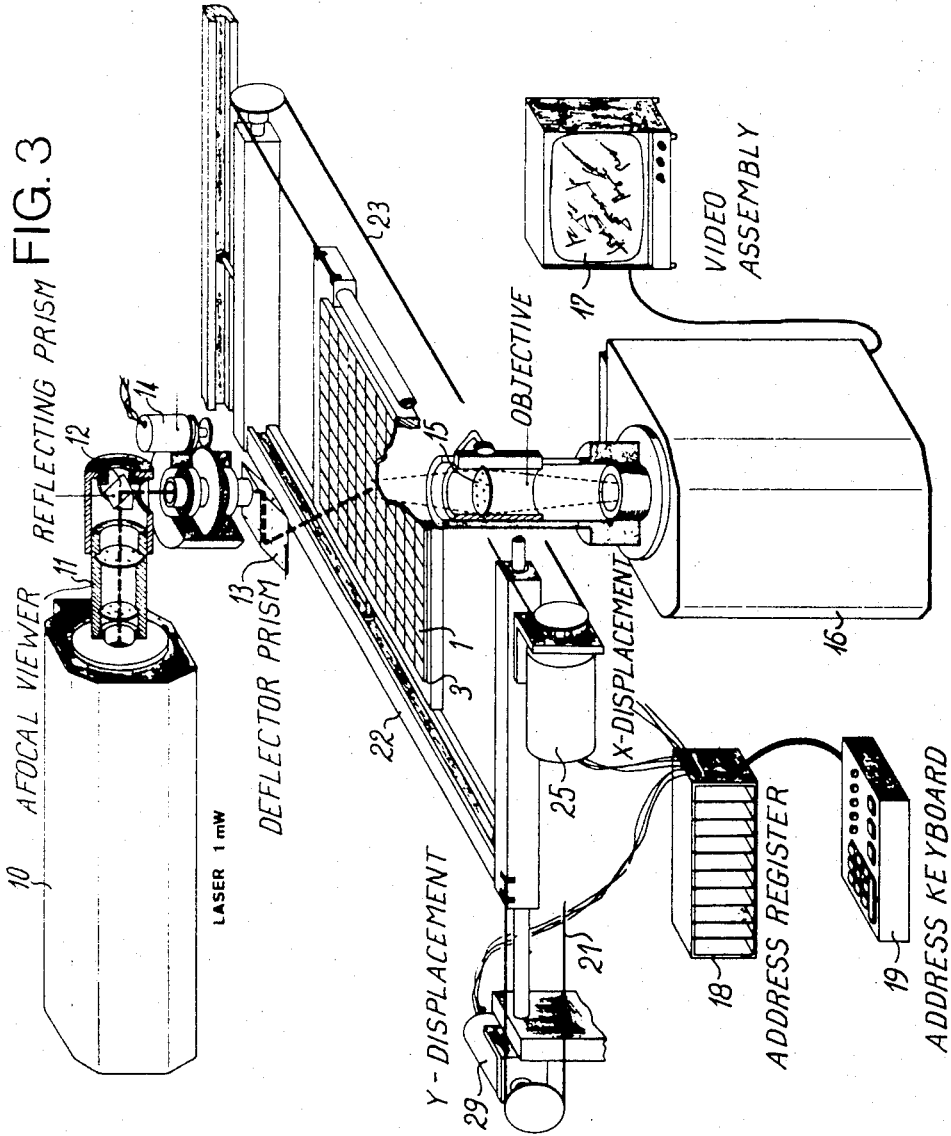
FIG. 3 shows a second device according to the invention for reading the holograms.

In FIG. 3 the reference numerals 1, 3, 10 to 19 refer to the same elements as in FIG. 2, but the plate 22, instead of being circular as plate 2, is rectangular and, instead of being capable of movement of rotation and of translation can be moved in translation in perpendicular directions, by the motors 25 and 29. The address register 18 controls the positioning of these motors which control in turn the position of the plate 22 by means of the belts 21 and 23.

Figure 4:
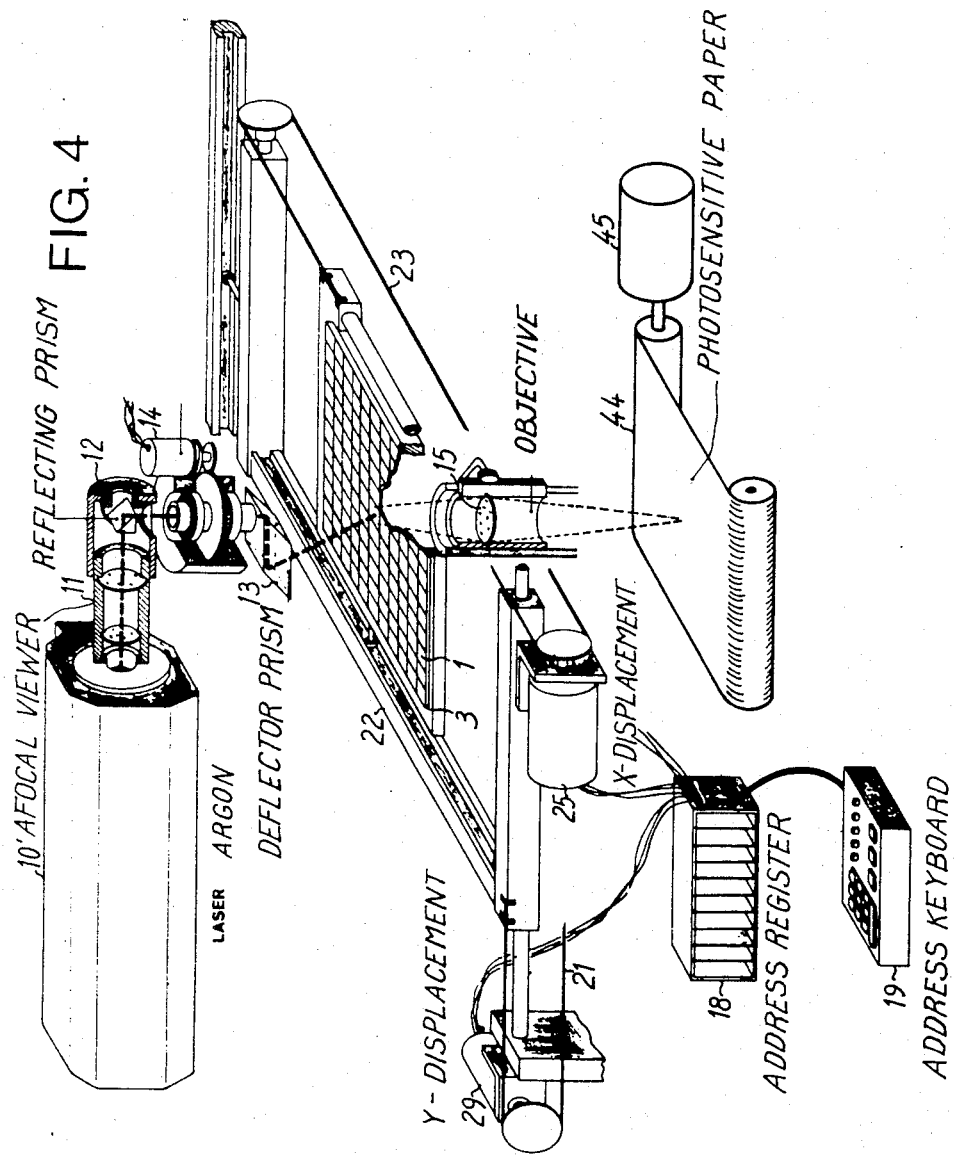
FIG. 4 shows a third device according to the invention for recording the read-out holograms on photosensitive paper.

In FIG. 4, the reference numerals 1, 3, 11 to 15, 18 and 19 refer to the same elements as in FIG. 3, the video assembly 16–17 being replaced by a photosensitive paper 44 which allows the photocopying of data stored in the apparatus, the paper being advanced with the help of a winding motor 45. In this case the laser 10' is an argon laser with greater output than the laser 10 of FIGS. 2 and 3.

Figure 5:
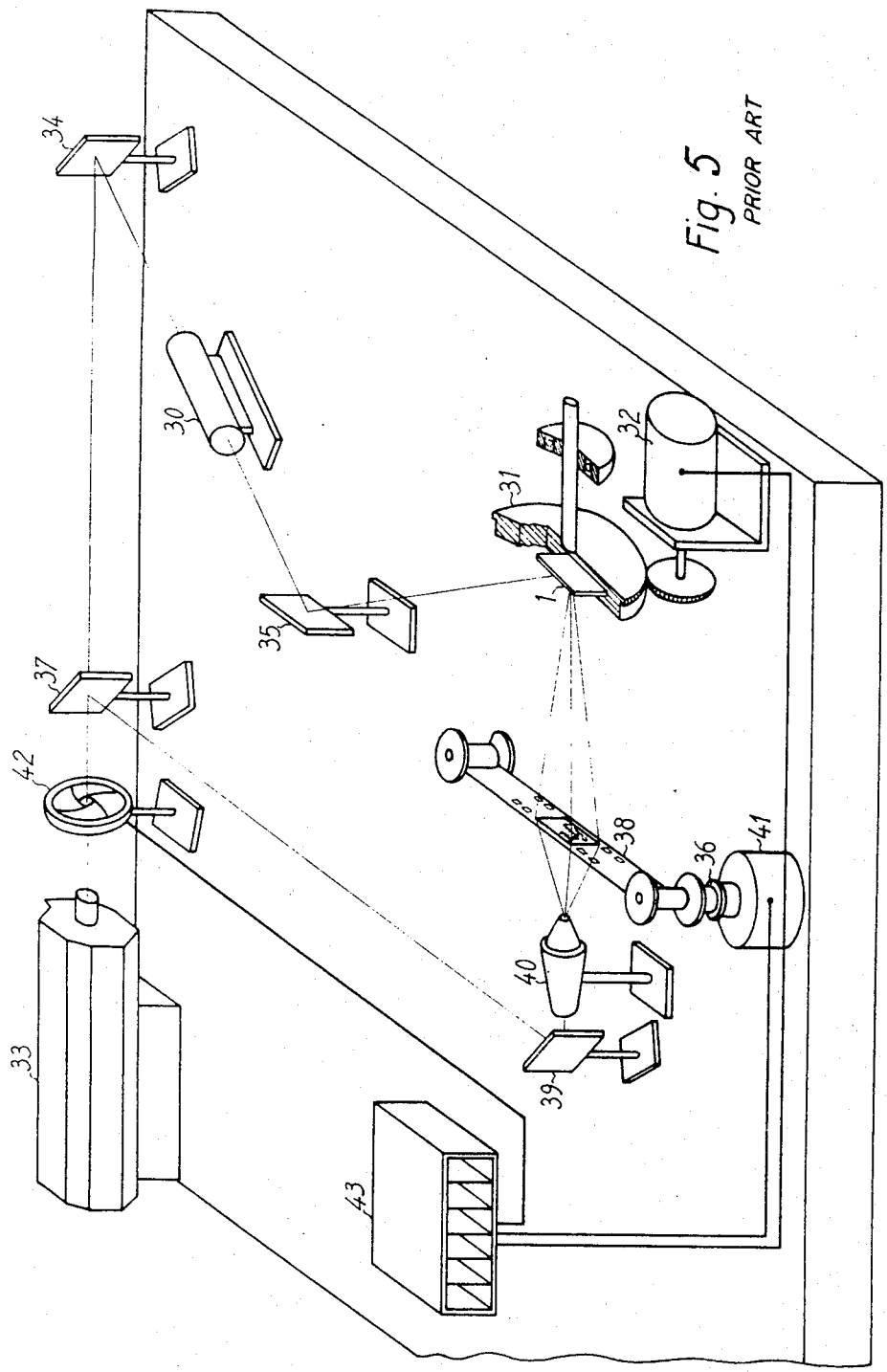
FIG. 5 represents a device of the prior art for recording holograms.

FIG. 5 shows a device for forming the holograms according to the prior art. A small photographic plate 1 is placed on a mounting 31 driven by a stepping motor 32 which can stop in sixty successive angular positions 6° apart. This plate receives the light from an argon laser transmitter 33 with a 250mW output, on th one hand directly by way of shutter 42, beam splitter 37, mirror 34, afocal viewer 30, mirror 35 and, on the other hand, through a film 38 by way of shutter 42, beam splitter 37, mirror 39, divergent objective 40 and convergent objective 46. On the film 38 figure a series of frames which are the graphical data of which it is desired to form the holograms. A motor 41 advances the film step by step by means of an advancing device 36 of conventional type as used in photographic technique.

The control circuit 43 regulates the exposure time and the step-by-step advance of the motors 32 and 41. When sixty holograms have been formed on the plate 1, a new plate is fitted into the apparatus. For the reasons set forth in the introductory part, the prior art hologram recorder of FIG. 5 cannot be used in the hologram storage, accessing and display device of the invention.

Figure 6:
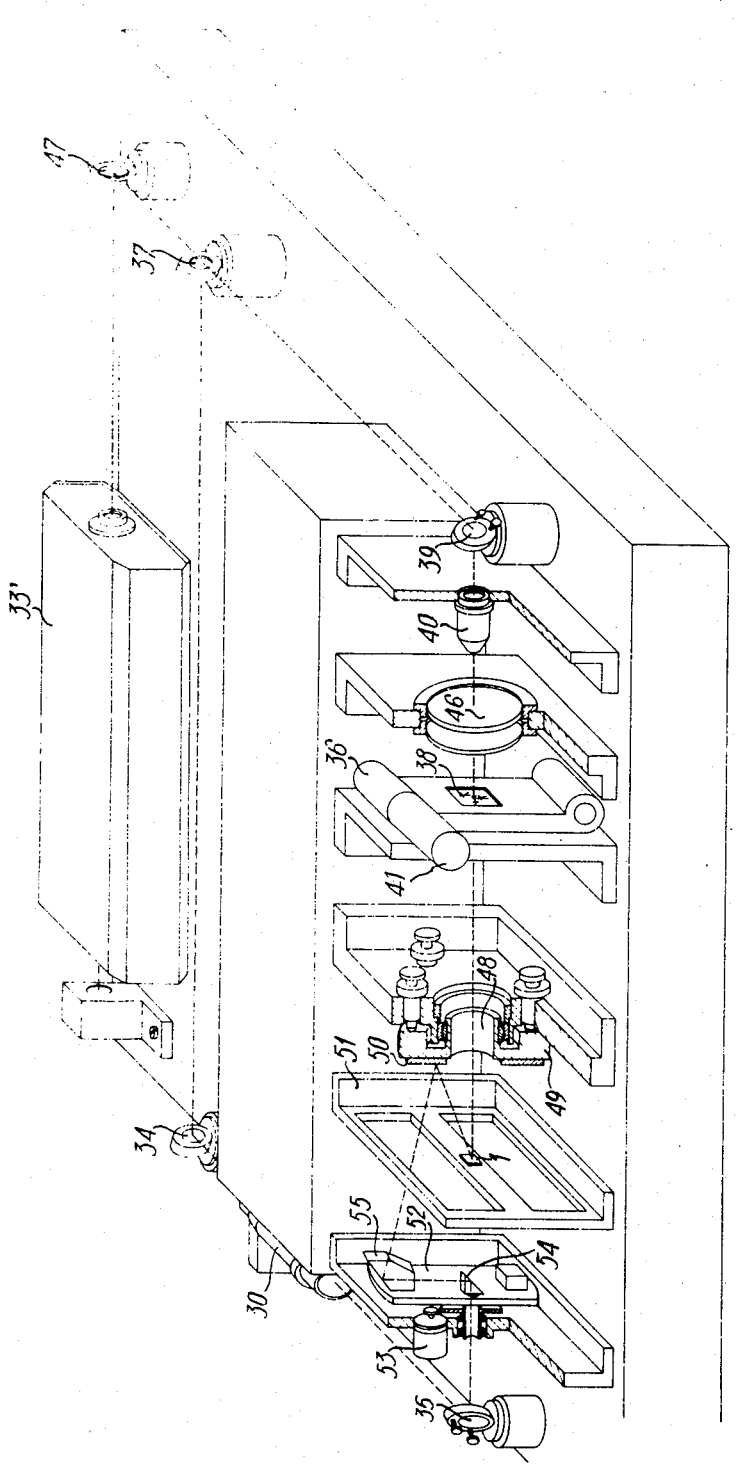
FIG. 6 shows a system of recording graphical data in the form of holograms in which the object-carrier and the hologram carrier are fixed and the reference beam describes a cone.

With reference to FIG. 6, which refers to a hologram recorder according to the invention, the photographic plate constituting the hologram carrier 1 is placed on a mount 51 which is fixed and no longer mobile as is the mount 31 in FIG. 5. This plate receives the object beam from the helium-neon laser transmitter 33' which has an output of 10mW approximately via the reflecting mirror 47, the semi-transparent mirror 37, the reflecting mirror 39, the divergent objective 40, the convergent objective 46, the film 38 and the central aperture 48 of an apparatus 49 supporting an annular mirror 50. The objective 46 serves to recoverge the beam on to the film 38 and its focal plane contains the hologram carrier.

The plate 1 receives an oblique and rotatory reference beam supplied by the laser transmitter 33' via the reflecting mirror 47, the semi-transparent mirror 37, the reflecting mirror 34, the afocal viewer 30, the reflecting mirror 35 and the prism-supporting turning apparatus 52. This apparatus 52 is driven by an electric motor 83 and supports a first rectangular triangular prism 54 on the axis of the turning apparatus which deflects the axial beam into a radial perpendicular beam and a pentagonal prism 55 which reflects the radial beam obliquely towards the annular mirror 50. This latter mirror reflects the reference beam on to the hologram carrier 1. The motor 53 is controlled by the control circuit 43 seen in FIGS. 7 to 9.

In this way there has been realized an exposure system from a fixed object carrier onto a fixed hologram carrier, with a fixed object beam perpendicular to the hologram carrier and a turning recording reference team.

Figure 7:
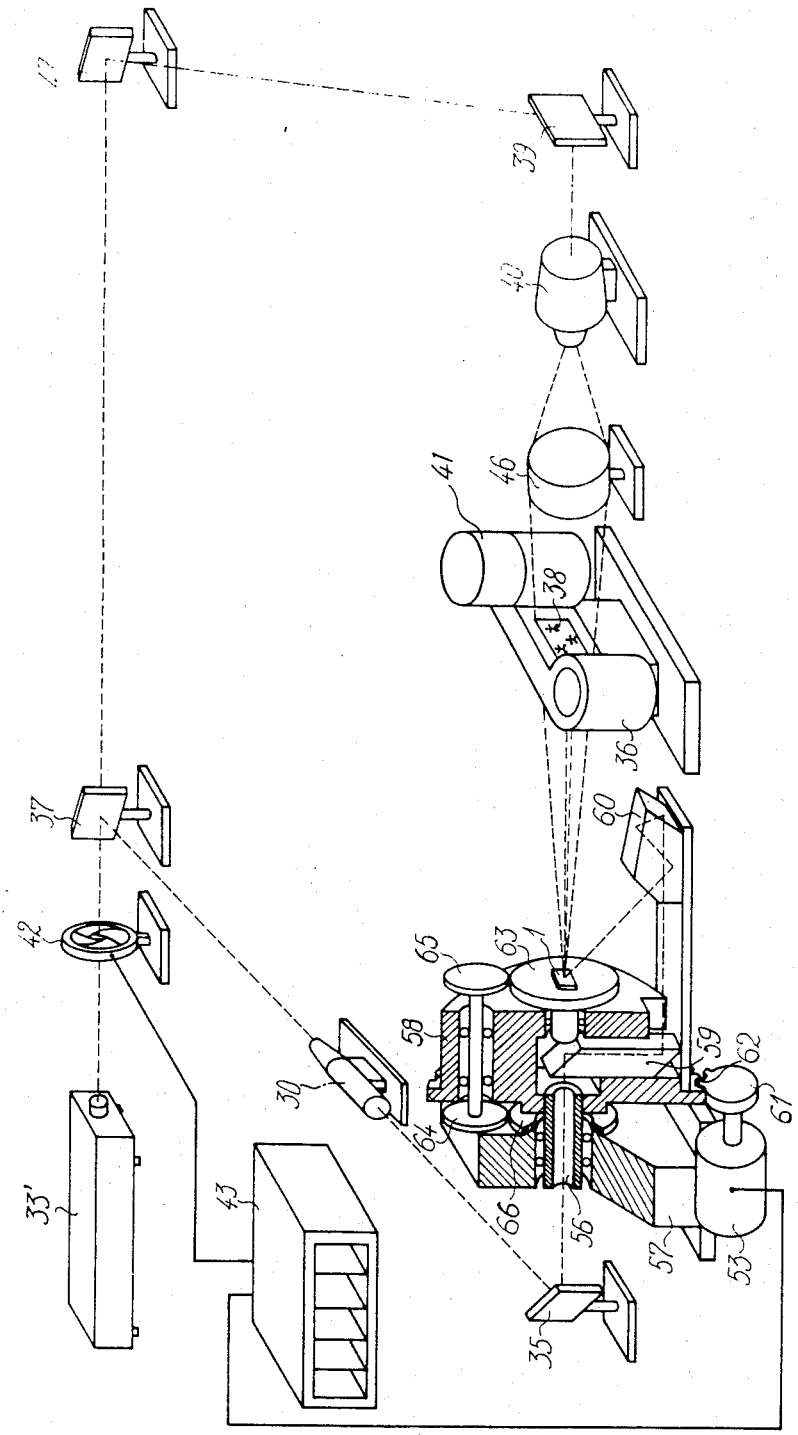
FIG. 7 represents a system of recording graphical data in the form of holograms in which the object carrier is fixed, the reference beam describes a cone and the hologram carrier, although mobile, is kept fixed, despite the rotation of the reference beam, by a differential mechanism.

Referring now to FIG. 7, we find the laser transmitter 33', the shutter 42, the semi-transparent mirror 37, the reflecting mirrors 47 and 39, the divergent objective 40, the convergent objective 46, the film 38 which are located along the object beam towards the hologram carrier 1.

The recording reference beam follows a trajectory comprising the shutter 42, the semi-transparent mirror 37, the afocal viewer 30 and the reflecting mirror 35. It crosses the axial part of the fixed stand 57 of a rotating apparatus 58 via a tube 56. This rotating apparatus supports a parallelipipedic prism 59 which converts the axial beam into an excentric beam and a pentagonal prism 60 which reflects this excentric beam obliquely towards the hologram carrier 1. The rotating apparatus 58 is driven by an electric motor 53 driving a pinion 61 which engages with a toothed crown 62 of the said apparatus. The motor 53 is controlled by the control circuit 43.

The hologram carrier 1 is not supported directly by the rotating apparatus 58 but by a disc 63 coaxial to the apparatus 58 and rotatory in respect thereto. The disc 63 is toothed on its periphery and the rotating apparatus 58 supports two pinions 64 and 65 of the same diameter and mounted on the same shaft of which one 64 engages with a fixed toothed wheele 66 integral with the stand 57 and the other 65 with the disc 63. The result is that in the course of the rotation of the apparatus 58 which turns the recording reference beam, the hologram carrier remains fixed.

Figure 8:
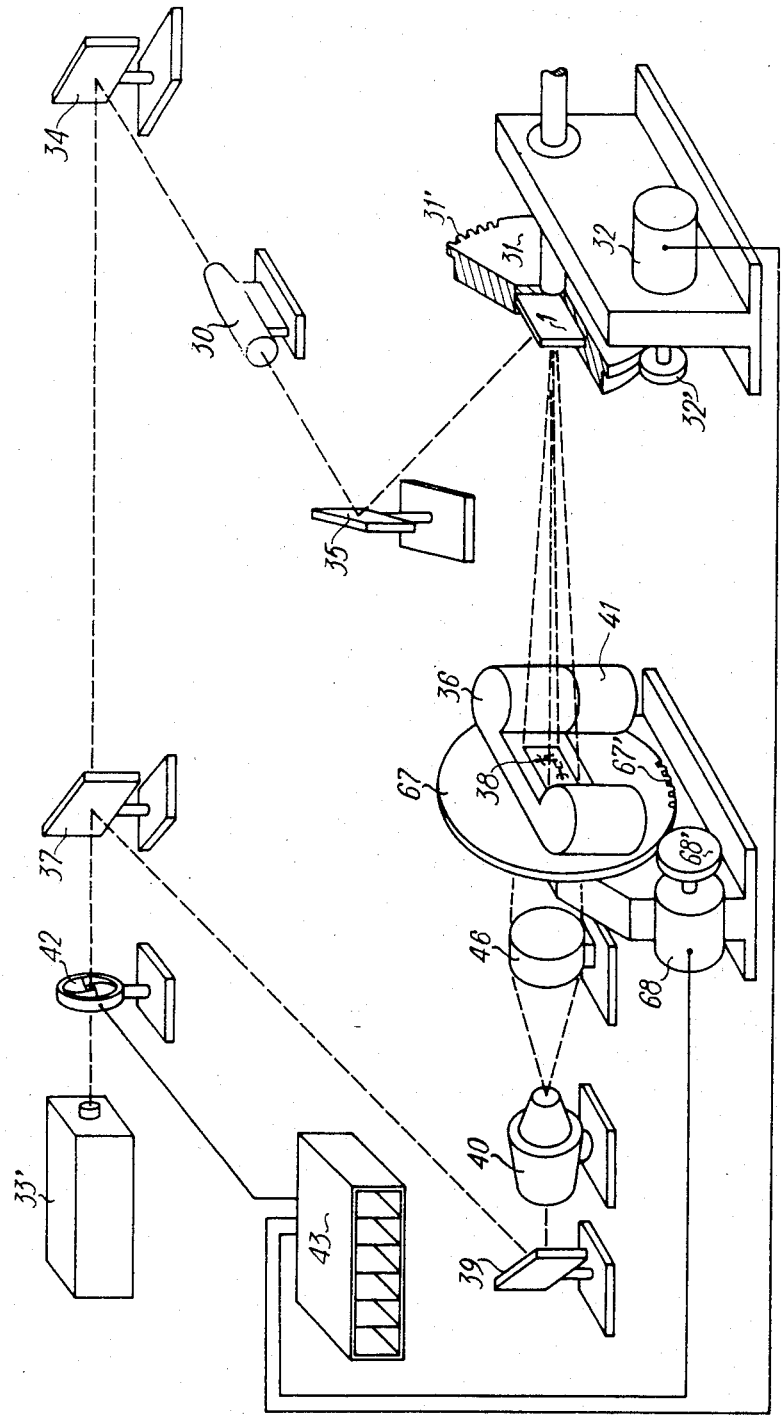
FIG. 8 describes a system of recording graphical data in the form of holograms in which the reference beam is fixed and the assembly of the object carrier and the hologram carrier is rotary.

FIG. 8 differs from FIG. 7 only by the fact that the film 38, its advancing device 36 and its control motor 41 are mounted on a mobile apparatus 67 which has a peripheral toothed crown 67' and is driven by a servo-motor 68 by virtue of the pinion 68'. The hologram carrier 1 is mounted on a rotatory apparatus 31 having a peripheral toothed crown 31' and is driven by a servo-motor 32 by virtue of the pinion 32'. The servo-motors 68 and 32 are synchronous. The hologram carrier and the film and its projection device, or more generally the object-carrier, could of course be mounted on a single rotatory apparatus driven by a single motor.

The other reference numbers in FIG. 8 designate the same elements as in FIG. 7.

Figure 9:
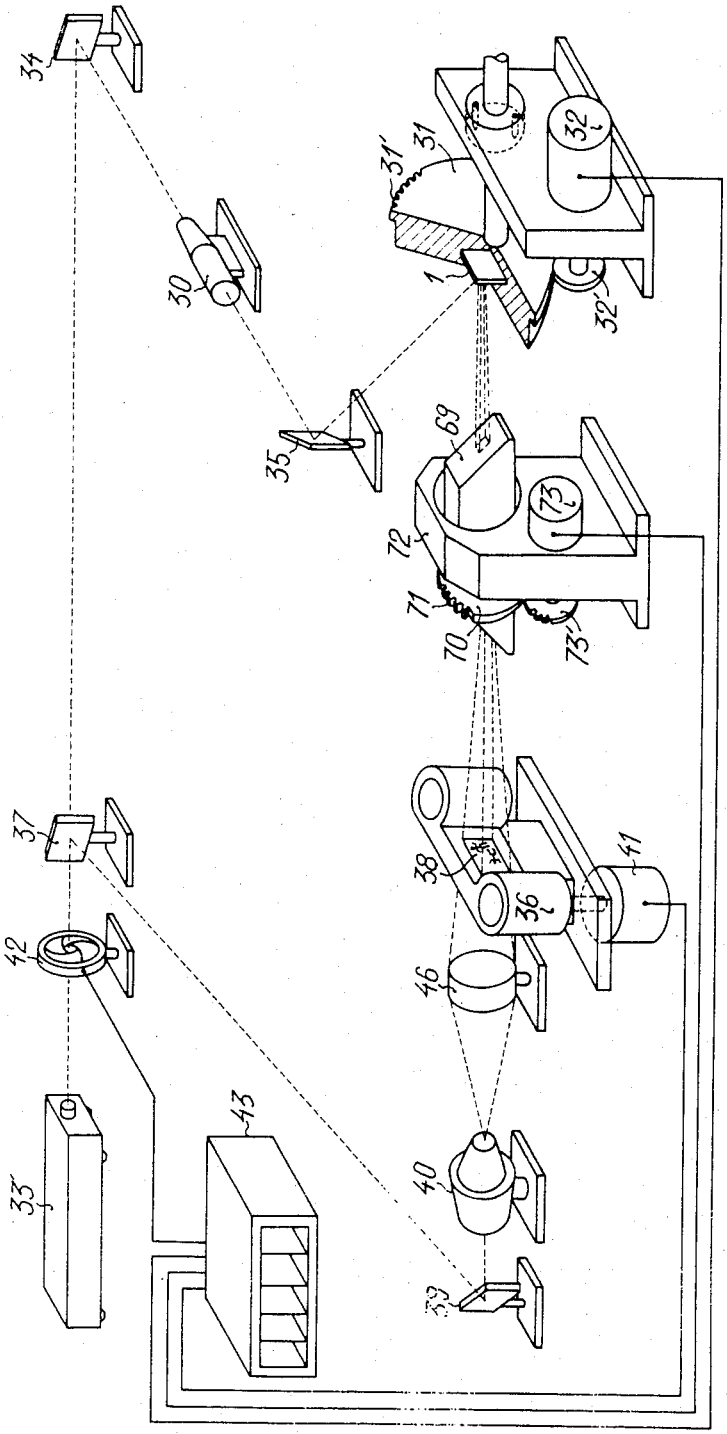
FIG. 9 describes a system of recording graphical data in the form of holograms in which the reference beam is fixed, the object-carrier is fixed, the hologram is rotatory and a Dove prism makes it possible to virtually turn the object-carrier.

In FIG. 9 the object-carrier comprising the film 38, its advancing device 36 and its motor 41 are fixed and a Dove prism 69, mounted on a rotatory apparatus 70 possessing a toothed crown 71 and turning in respect of a stand 72, is interposed between the object-carrier and the hologram carrier 1 placed on its rotary apparatus 31. The prism is driven in rotation by a motor 73 of which the shaft carries a pinion 73' which engages with the toothed crown 71. The motor 32 and the motor 73 are controlled by the control circuit 43 in such a way that the motor 73 turns at an angle which is half of that at which the motor 32 turns.

What we claim is:

1. System for recording graphical data in the form of hologram on a plurality of hologram carriers, each hologram carrier storing a group of holograms, and for accessing and displaying selected graphical data recorded in said hologram carriers comrising recording means including object carrier means for holding transparent selected objects, a rotatable hologram carrier fixed with respect to said object carrier means, a coherent light source giving rise to an object beam and a recording reference bean, motor-driven rotatable prism means for allowing said recording reference beam to describe a cone around the axis of the object beam and to take discrete azimuthal angular positions on said cone, said rotatable prism means being mounted on said rotatable prism means for independent rotation about a common axis with said rotatable prism means, differential gearing means also mounted on said rotatable prism means for connecting said fixed shaft and said hologram carrier and for maintaining said hologram carrier in a fixed orientation regardless of the orientation of said rotatable prism means, means for directing said object beam through one of said selected objects and onto a first front side of said hologram carrier along a path which is colinear with said common axis, and means for directing said reference beam from said source to said rotatable prism means along a path colinear with said common axis on a second back side of the hologram carrier which is opposite to said first front side, said rotatable prism means including a projecting arm and a reflecting prism means mounted thereon for directing said reference beam around said hologram carrier to said first front side, said object beam and recording reference beam interfering in said hologram carrier, displaying means including a coherent light source giving rise to a displaying reference beam, means for allowing said displaying reference beam to describe a cone around the normal to a hologram carrier and to take discrete azimuthal angular positions on said cone, and accessing means including means for arranging the hologram carriers in a two-dimensional matrical array, means for moving said arranging means in two dimensions so as to position a selected hologram carrier in said array on the trajectory of said displaying reference beam and means for positioning said displaying reference beam in a selected one of its discrete azimuthal angular positions.

2. A system as claimed in claim 1 wherein said arranging means comprises a circular plate, each hologram carrier being at a defined radial distance and at a defined polar angle and wherein said means for moving said arranging means in two dimensions comprising means for rectilinearly translating the axis of said circular plate so as to select a predetermined radial distance and means for rotating said plate so as to select a predetermined polar angle whereby a hologram carrier corresponding to the defined distance and angle is selected.

3. A system as claimed in claim 1 wherein said arranging means comprises a rectangular plate, each hologram carrier being located on said plate at a defined abscissa distance and at a defined ordinate distance and wherein said arranging means in two-dimensions comprises means for rectilinearly translating said rectangular plate along the abscissa direction so as to select a predetermined abscissa distance and means for rectilinearly translating said rectangular plate along the ordinate direction so as to select a predetermined ordinate distance whereby a hologram carrier corresponding to the defined abscissa and ordinate distance is selected.

4. System for recording graphical data in the form of holograms on a plurality of hologram carriers, each hologram carrier storing a group of holograms, and for accessing and displaying selected graphical data recorded in said hologram carriers said system comprising recording means; object carrier means for holding transparent selected objects; a coherent light source giving rise to an object beam and a recording reference beam; motor-driven rotatable prism means mounted on a fixed shaft for allowing said recording reference beam to describe a cone around the axis of the object beam and to take discrete azimuthal angular positions on said cone; a rotatable hologram carrier mounted for coaxial independent rotation on said rotatable prism means; differential gearing means connecting said fixed shaft to said hologram carrier for maintaining said hologram carrier in a fixed spatial relationship with respect to said object carrier means; means for directing said object beam to one of said selected objects and then onto said hologram carrier, means for directing said reference beam from said source to said rotatable prism means along a path colinear with the axis of rotation of said rotatable prism means, said object beam and recording reference beam interfering in said hologram carrier, displaying means including a coherent light source giving rise to a displaying means including a coherent light source giving rise to a displyaing reference beam, means for allowing said displaying reference beam to discribe a cone around the normal to a hologram carrier and to take discrete azimuthal angular positions on said cone, and accessing means including means for arranging the hologram carriers in a matricial array, said matrical array of said arranging means comprising a circular plate, each hologram carrier being defined on said plate by a radial distance and a polar angle, means for rectilinearly translating the axis of said circular plate in response to said radial distance and rotating the circular plate in response to said polar angle to position a selected hologram carrier in said array on the trajectory of said displaying reference beam and means for positioning said displaying reference beam in a selected one of its discrete azimuthal angular position.

* * * * *